May 12, 1942. J. A. HELLMUTH 2,282,356
METHOD AND APPARATUS FOR LIGHTING AREAS PARTICULARLY APPLICABLE TO
FACILITATING NIGHT LANDINGS BY AIRCRAFT
Filed Oct. 31, 1939
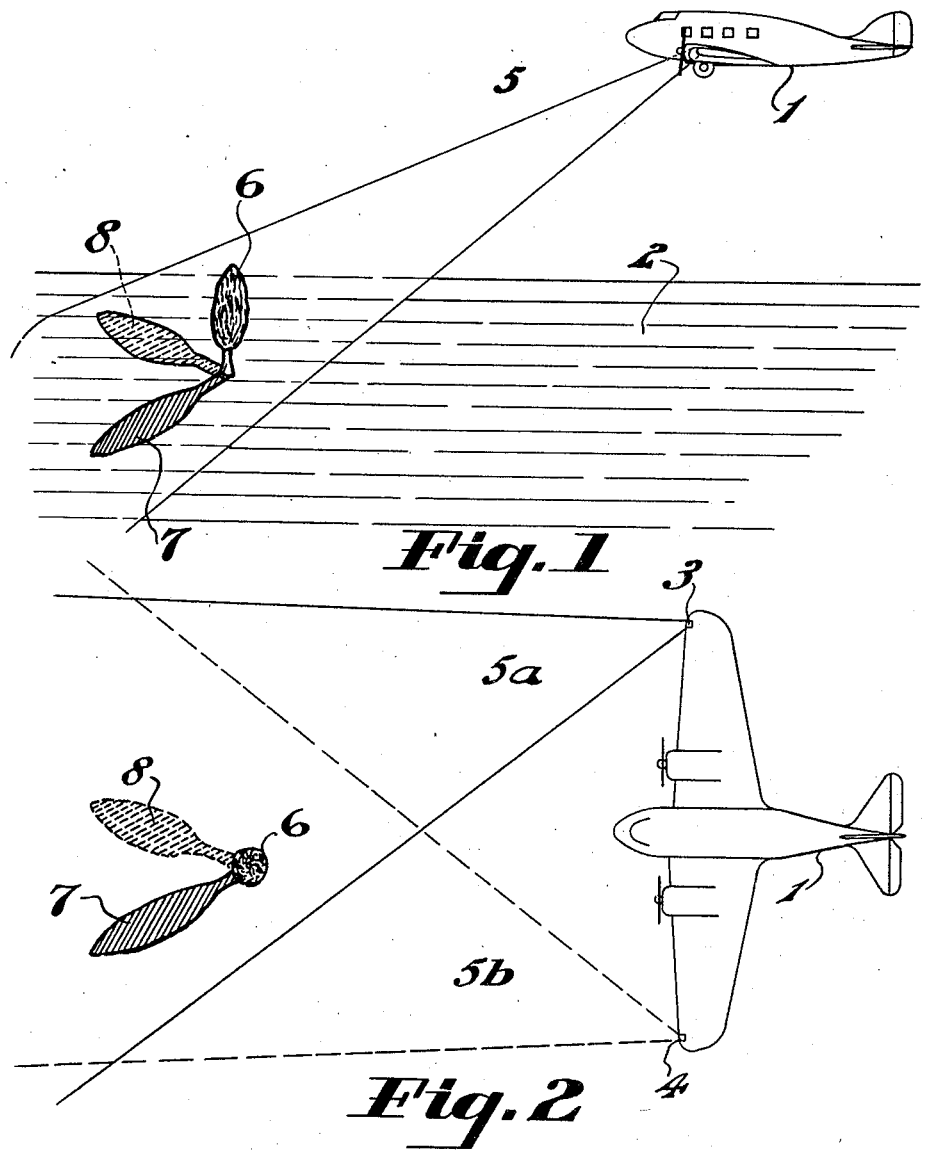
INVENTOR
JACOB ADOLF HELLMUTH
BY
ATTORNEY Patented May 12, 1942

2,282,356

UNITED STATES PATENT OFFICE 2,282,356

METHOD AND APPARATUS FOR LIGHTING AREAS, PARTICULARLY APPLICABLE TO FACILITATING NIGHT LANDINGS BY AIRCRAFT

Jacob Adolf Hellmuth, Bloemfontein, Orange Free State, Union of South Africa

Application October 31, 1939, Serial No. 302,128
In Great Britain November 2, 1938

6 Claims. (Cl. 240—7.7)

This invention relates to an improved method and apparatus for illuminating areas or terrain so as clearly to ascertain the positions and nature of objects and irregularities thereon, by means of the shadows cast thereby, and is particularly applicable to facilitating night landing of aircraft.

It has been found that when one or more powerful lights is or are directed onto an object, the object is often indistinguishable particularly when such object has the same coloring as its surroundings, while the shadow cast by the rays of light impinging on the object, is often obliterated from the view of an observer in the immediate vicinity of the light source by the object itself. These are difficulties pilots of aircraft encounter when forced to make a landing in darkness, especially when such landing is to be effected on unknown terrain. Although aircraft are usually equipped with light flares, the supply thereof is limited and consequently, on exhaustion of the supply, a forced night landing must be effected with the aid of the electric lighting equipment of the aircraft itself.

According to the invention, an area or terrain during darkness is illuminated by projecting obliquely on to it, the converging light beams of two or more elevated laterally spaced light sources arranged for intermittent illumination in such a manner that the shadows of objects or irregularities thereon are cast in alternate directions so as to give the effect of moving shadows, which movement makes the position and nature of said objects or irregularities discernible to an observer situated adjacent the light sources.

According to one form which the invention may take, two spaced light sources are provided, and means are associated therewith for their alternate intermittent illumination, whereby only one light source is illuminated at a time. According to an alternative form of the invention, one of said light sources is arranged to emit a constant beam of light, while the other light source is arranged to be intermittently illuminated. In this case the light beam from the constantly illuminated light source is preferably less intense than the intermittent light beam. This last-mentioned arrangement is especially applicable to search lights.

According to a simple form of the invention when employed as an aid to night landing of aircraft, use is made of two forwardly and downwardly projecting beams of light from light sources spaced as far apart as possible and situated on the aircraft itself. The beams of light are projected at converging angles, with respect to one another and obliquely to the area under examination.

The alternate illumination and extinction of the light sources is arranged to take place rapidly, so that movement of the shadow or shadows from one side of an object to the other is readily perceptible. In this connection a speed of from one to three flashes per second from each light source will give satisfactory results. If the flashes take place above this speed, the moving shadows tend to overlap or merge in the form of a partial halo, and a clear definite appearance of movement is not obtained.

By spacing the light sources as far apart as possible such as adjacent the wing tips, the shadows cast from side to side of the object on the ground will be visible to an observer situated between the light sources, such as the pilot of an aircraft.

Any known means may be employed to control the intermittent illumination of the light sources, which means may be electrical, clockwork, manual or the like.

According to a preferred method of carrying out the invention in practice, the light sources consist of electric incandescent lamps controlled as regards their intermittent and alternate emission of light beams by a rotary or other "make and break" type of switch, operated either electrically or mechanically.

During flight at night the method and apparatus is used to ascertain the nature of the surface of the ground for landing purposes. If no shadows are cast the pilot will know that there are no objects or irregularities on the terrain below, which is therefore suitable for landing, and conversely according to the amount and position of the shadows cast, the pilot may determine areas suitable or unsuitable for landing.

Although in the above description the method and apparatus are described for application to aircraft, the invention may also be adapted for use in connection with search lights, for advertising purposes and any other purpose where it is desired to draw the attention of the eye to an object by increasing the amount of shadow by the intermittent effect of the shadows.

In applying the invention to aircraft, means may be provided for projecting the situation of the light sources telescopically or otherwise beyond the wing-tips or any other positions on the aircraft.

To enable the invention to be more clearly understood and carried into practice, reference is now made to the accompanying drawing, in which like references denote like parts throughout both views.

In the drawing:

Fig. 1 is a side elevation of an aeroplane fitted with apparatus operating according to the invention, and Fig. 2 is a plan view taken on Fig. 1.

Referring to the drawing, reference 1 denotes an aeroplane, while 2 shows an area of land under observation by the pilot as a possible landing ground. Lamps 3 and 4 fitted adjacent the wing tips, are arranged to project converging beams of light 5 in a forward and downward direction so as to illuminate a substantial area of ground. The lamps 3, 4 are of the electric incandescent type and suitable switching mechanism is associated therewith for the alternate intermittent illumination thereof. Such switching means may be conveniently driven from the engine or engines of the craft or by a separate small electric motor or clockwork mechanism.

Considering Fig. 2, the full lines 5a represent the converging beam of light from the lamp 3 which is assumed to be illuminated. The other lamp 4 at this instant is extinguished but the direction of its beam when lit is shown by the dotted lines 5b.

The beam 5a directed on to a tree 6, causes it to cast a shadow 7, while the beam 5b will cause the tree 6 to cast a shadow 8, shown by dotted lines. The rapid alternating illumination and extinguishing of the lamps 3 and 4 will create an appearance of movement as the shadows 7 and 8 displace one another in rapid succession. This movement draws the pilot's attention to objects and irregularities on the ground, far more effectively than a constant light beam would do, and thereby enables him to decide more accurately the suitability or otherwise of a particular area for landing purposes.

It has been found that in the case of electric incandescent lamps, alternate intermittent illumination is conveniently obtained by the use of a rotary switch of the kind employed in connection with "neon" signs of the flashing type. The rotary contact is so arranged that a very slight overlap takes place whereby the contact for the lighting of one lamp, takes place before the circuit to the other lamp has been broken.

What I claim is:

1. The method of facilitating the night landing of flying aircraft consisting of convergingly and obliquely downwardly projecting concentrated light beams from laterally spaced light sources located at an altitude for the illumination of an object on the ground from different frontal positions, and intermittently interrupting at least one of said light sources thereby to render said object distinguishable from the surrounding terrain by contrast with its periodically appearing shadow.

2. The method of facilitating the night landing of flying aircraft, consisting of convergingly and obliquely downwardly projecting concentrated light beams from laterally spaced light sources located at an altitude for the illumination of an object on the ground from different frontal positions, and alternately interrupting said light sources so as to project shadows from said object in alternately different directions thereby rendering said object distinguishable from the surrounding terrain by contrast with its fluctuating shadows.

3. The method of facilitating the night landing of flying aircraft consisting of constantly projecting a concentrated light beam angularly and obliquely downwardly from one of a laterally spaced pair of light sources for the illumination of an object on the ground from one angle of incidence to cast a constant shadow in one direction, and intermittently projecting a concentrated light beam angularly and obliquely downwardly from the other light source across the constant light beam for the intermittent illumination of said object from a complemental angle of incidence to render the object distinguishable from the surrounding terrain by contrast with its recurring shadow in another direction.

4. The method of claim 3 wherein the constantly projected light beam is less intense than the intermittently projected light beam.

5. The method of facilitating the night landing of flying aircraft consisting of convergingly and obliquely downwardly projecting concentrated light beams from laterally spaced light sources located at an altitude for the illumination of an object on the ground from different frontal positions, and alternately interrupting said light sources in delayed sequence so as to overlap the projection of the light beams and resultingly project shadows from said object in successively different directions interspersed with shadow projections in simultaneously different directions to enable the distinguishment of said object from the surrounding terrain by contrast with its background of variably playing shadows.

6. The method of facilitating the night landing of flying aircraft consisting of projecting concentrated light beams convergingly and obliquely downwardly from light sources located at the lateral extremities of the aircraft at varying intermittent rates to illuminate an object on the ground and at the same time contrast it from the incidentally illuminated surrounding terrain by the projection of inconstant, diverging shadows.

JACOB ADOLF HELLMUTH.